United States Patent Office 3,190,748
Patented June 22, 1965

3,190,748
PREPARATION OF OXALATE MAGNETIC PARTICLES
William C. Landgraf, Palo Alto, Calif., assignor to Ampex Corporation, Redwood City, Calif., a corporation of California
No Drawing. Filed Feb. 28, 1963, Ser. No. 261,818
5 Claims. (Cl. 75—108)

This invention relates to the manufacture of alloy magnetic powders suitable for use as pigments in the manufacture of magnetic recording tape. More particularly, the invention relates to a method of making such powders from oxalates of iron, cobalt and preferably nickel formed by the reaction of oxalic acid or its ester with a mixture of metal salts in the presence of an ultrasonic field.

It has previously been proposed to react metal salts of cobalt and iron with oxalic acid in order to precipitate a mixture of oxalates and then decompose the oxalates in an inert atmosphere or a reducing atmosphere to form magnetic particles. A somewhat related process is shown in copending application Serial No. 252,610, filed January 21, 1963, where an oxalate ester is substituted for the acid. It has now been found that if one employs an ultrasonic field during precipitation, superior magnetic results are obtained.

The present invention is carried out by first forming a mixture of metal salts, such as chlorides or the sulfates of iron, cobalt and preferably nickel, and reacting the salts at room temperature with oxalic acid or one of its esters in the presence of an ultrasonic field which results in the co-crystallization of the corresponding metal oxalates. The solution is then filtered and the precipitate is washed with water, dried, and then placed in a furnace and heated in an inert or reducing atmosphere to reduce the particles to the desired magnetic pigment.

The ultrasonic vibrations to which reference is made should be at least 10,000 cycles per second. Generally, there is no advantage in using vibrations having frequencies above about 90,000 cycles per second. A preferred frequency is 40,000 cycles. The power input is preferably from about 0.3 to about 0.8 watt per square centimeter, though acoustical intensities as low as 0.1 watt give fair results. Intensities of up to about one watt per square centimeter may be used.

Methods of converting energy into ultrasonic waves by the use of various transducers are well known, as, for example, means which utilize the piezoelectric effect, e.g. as exhibited by quartz and barium titanates, as well as means which are magnetostrictive. Various flow devices, such as ultrasonic horns and whistles, are effective for producing the desired ultrasonic waves of at least minimum intensity, such as the "Rapisonic" ultrasonic emulsifier of the Sonic Engineering Corporation, Stamford, Connecticut, utilizing a jet of liquid on the edge of a blade, causing the blade to vibrate in a natural frequency of about 22,000 c.p.s. Various such transducers are described in the Encyclopedia of Chemical Technology, 14, 407–422, Kirk-Othmer.

Generally speaking, it is preferred to use from 30 to 50 mole percent of cobalt; from 40 to 70 mole percent of iron and nickel may or may not be present in the composition. If nickel is used, it can be used at percentages from 2 to 20 mole percent of the total composition.

The following non-limiting examples illustrate preferred embodiments of the present invention.

Example 1

A mixture was made containing 11.9 grams $NiCl_2 \cdot 6H_2O$ 19 grams $CoCl_2 \cdot 6H_2O$; and 89.5 grams $FeCl_2 \cdot 4H_2O$ (0.05 mole, 0.50 mole, 0.45 mole, respectively). This mixture was added to 10 liters of distilled water, stirred, and placed in a tank to which a 30 kilocycle A.C. field could be applied. Stirring was continued at room temperature while 138 grams (1.1 mole) of oxalic acid dissolved in 4 liters of distilled water was added. With complete mixing of the halides and oxalic acid, the mixing was stopped, and the 40 kilocycle field was applied. Piezoelectric crystals were actuated by an independent power supply. The oscillation from the crystals were transmitted through the reaction vessel to the solution contained therein. The generator used was a "Son Blaster," produced by the Narda Ultrasonics Corporation, Westbury, Long Island. Frequency was 40 kc., and the power output was 300 watts. The precipitate was recovered by filtration and was then washed three times with distilled water, twice with methanol, and was then dried for 4 hours at 100° C. Thirty-one grams of the precipitate were then placed in a furnace, heated to 390° C. for 24 hours under an atmosphere of hydrogen gas. After this period, the particles were cooled and recovered. They were then mixed with a toluene solution of an organic polymer and thereafter coated on a thin plastic tape. The magnetic properties were evaluated using a 60 cycle hysteresis loop tracer and Br and Bm values were found to be 75% to 100% higher than similar particles which have been prepared utilizing oxalic acid without the presence of a 30 kilocycle field. The Bm value was 4300 gauss for particles prepared using oxalic acid with the 30 kilocycle field as compared with 2400 gauss for particles precipitated using oxalic acid without the 30 kilocycle field.

Example 2

A mixture of 26.5 grams $NiSO_4 \cdot 6H_2O$; 153 grams $FeSO_4 \cdot 4H_2O$; and 88.3 grams $CoSO_4 \cdot 6H_2O$ was dissolved in distilled water and an equimolar quantity of oxalic acid used to precipitate the oxalates, using the procedure of Example 1. Following recovery and processing as in Example 1, the Bm value was found to be 3200 gauss.

Example 3

The following mixture was prepared and precipitated with an equimolar quantity of oxalic acid under the conditions described in Example 1. The precipitate was further processed as in Example 1.

| Mol Quantity | Compound | Grams | Bm Value |
|---|---|---|---|
| .70 | $FeCl_2 \cdot 4H_2O$ | 139 | |
| .30 | $CoCl_2 \cdot 6H_2O$ | 72 | 2,800 Gauss. |
| .05 | $NiCl_2 \cdot 6H_2O$ | 11.9 | |

Example 4

The following mixture was prepared and precipitated with an equimolar quantity of oxalic acid under the conditions described in Example 1. The precipitate was further processed as in Example 1.

| Mol Quantity | Compound | Grams | Bm Value |
|---|---|---|---|
| .35 | $FeCl_2 \cdot 4H_2O$ | 70 | |
| .55 | $CoCl_2 \cdot 6H_2O$ | 131 | 3,200 Gauss. |
| .10 | $NiCl_2 \cdot 6H_2O$ | 24 | |

Employing the same concentration of the various halides, it is possible to precipitate the mixed oxalates by employing methyl oxalate. Using 1.1 mole of methyl oxalate (160 g.), the halides are precipitated in less than 15 minutes. The results are essentially the same (Bm value) as obtained with oxalic acid.

This method of producing oxalate particles gives resulting alloy particles which are denser than those produced by conventional techniques. It was observed that such alloy particles have an acicularity with an aspect ratio of 3 to 5 to 1. No such acicularity results from conventional precipitation techniques. These magnetic particles exhibit properties superior to similar alloy particles produced by conventional methods.

Obviously, many modifications and variations may be made without departing from the spirit and scope of this invention, and therefore only such limitations should be imposed as are indicated in the appended claims.

What is claimed is:

1. In a process where an aqueous mixture of metal salts comprising iron and cobalt salts selected from the class consisting of sulfates and chlorides is reacted with an oxalic compound selected from the class consisting of oxalic acid and organic esters of oxalic acid to precipitate iron and cobalt oxalates, the precipitate recovered and reduced to form a magnetic pigment, the improvements comprising: subjecting the mixture of said metal salts and said oxalic compound to the action of ultrasonic vibrations.

2. In a process where an aqueous mixture of metal salts comprising iron and cobalt salts selected from the class consisting of sulfates and chlorides is reacted with an oxalic compound selected from the class consisting of oxalic acid and organic esters of oxalic acid to precipitate iron and cobalt oxalates, the precipitate recovered and reduced to form a magnetic pigment, the improvements comprising: subjecting the mixture of said metal salts and oxalic compound to the action of ultrasonic vibrations of the frequency of 10,000 to 90,000 cycles per second.

3. In a process where an aqueous mixture of metal salts comprising iron and cobalt salts selected from the class consisting of sulfates and chlorides is reacted with an oxalic compound selected from the class consisting of oxalic acid and organic esters of oxalic acid to precipitate iron and cobalt oxalates, the precipitate recovered and reduced to form a magnetic pigment, the improvements comprising: subjecting a mixture of the said metal salts and oxalic compound to ultra-sonic vibrations of about 40 kilocycles.

4. In a process where an aqueous mixture of metal salts comprising iron, cobalt and nickel salts selected from the class consisting of sulfates and chlorides is treated with an oxalic compound selected from the class consisting of oxalic acid and organic esters of oxalic acid to precipitate iron, cobalt and nickel oxalates, the precipitate recovered and reduced to form a magnetic pigment, the improvements comprising: subjecting the mixture of said metal salts and said oxalic compound to the action of ultrasonic vibrations.

5. In a process where an aqueous mixture of metal salts comprising iron, cobalt and nickel salts selected from the class consisting of sulfates and chlorides, said iron salt constituting between about 4 and 70 mol percent of said metal salts, said cobalt salt constituting between about 30 and 50 mol percent of said metal salts, and said nickel salt constituting between about 2 and 20 mol percent of said metal salts, is treated with an oxalic compound selected from the class consisting of oxalic acid and organic esters of oxalic acid to precipitate iron, cobalt and nickel oxalates, the precipitate recovered and reduced to form a magnetic pigment, the improvements comprising subjecting the mixture of said metal salts and said oxalic compound to the action of ultrasonic vibrations.

References Cited by the Examiner

UNITED STATES PATENTS 2,636,892　4/53　Mayer _____ 252—62.5

FOREIGN PATENTS 419,953　11/34　Great Britain.
743,792　1/56　Great Britain.

BENJAMIN HENKIN, *Primary Examiner.*